Sept. 7, 1943. H. C. RONES 2,328,584
MULTIFOCAL LENS
Filed July 6, 1940 2 Sheets-Sheet 1
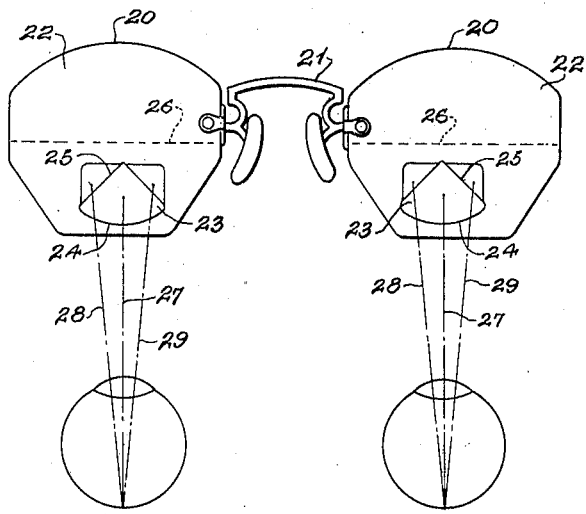
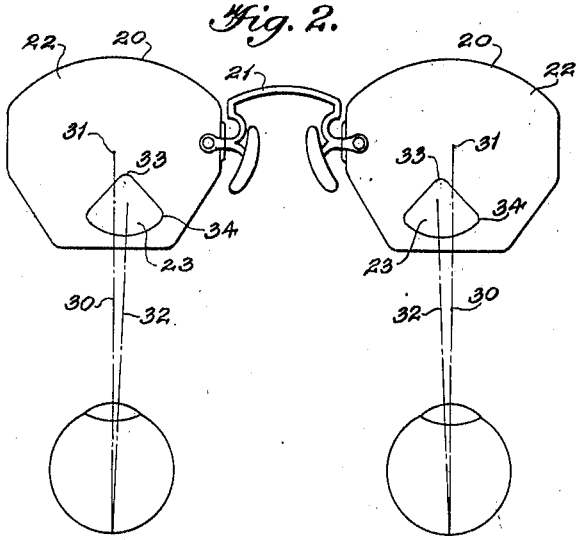
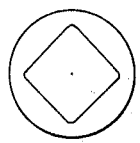
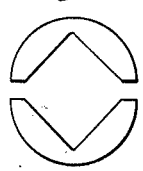
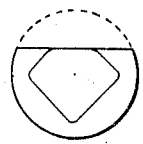
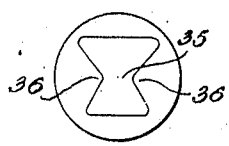
Inventor
Harvey C. Rones,
By Christian R. Nielsen
Attorney Sept. 7, 1943.　　　H. C. RONES　　　2,328,584
MULTIFOCAL LENS
Filed July 6, 1940　　　2 Sheets-Sheet 2

Inventor
Harvey C. Rones,
By Christian R. Nielsen
Attorney

Patented Sept. 7, 1943

2,328,584

UNITED STATES PATENT OFFICE 2,328,584

MULTIFOCAL LENS

Harvey C. Rones, Astoria, Oreg.

Application July 6, 1940, Serial No. 344,262

1 Claim. (Cl. 88—54)

The invention relates to bi-focal and multifocal eye glasses, and particularly to means for improving vision with such glasses by enabling the wearer to view near and far objects which are at approximately the same level in the normal field of vision, with a minimum of movement of the head to move the near vision element of the lenses into or out of the line of vision for such objects. That is to say, in the use of ordinary bi-focal lenses, the wearer will at one time use them for reading, ordinarily with the reading matter near the eye, and at a certain level with respect to the line of vision when the head is held in the natural position. At another time, such wearer of the glasses will require to observe some object on the floor or the ground, such as a golf ball, which will lie in some part of the same field which has been occupied by the reading matter viewed through the near vision element of the glasses, with the head in the same normal position. Using ordinary glasses the head must be tilted downwardly considerably, so that the wearer may gaze over the near vision element. It is an object of my invention to obviate the need for such severe tilting of the head and to enable the wearer to view objects or details in positions corresponding to that of a golf ball a short distance in front of the wearer, with a very slight shift of the head from that position in which the object may be viewed by direct forward gaze, while at the same time retaining the advantages of adequate serviceability for reading and corresponding uses.

It is an aim of the invention also to enable the attainment of foregoing objects while retaining the benefits possible from the use of a lens of intermediate focus different from that of the distant vision element and the near vision element of the lenses, where such multi-focal lenses are constructed, with novel results and advantages, as will appear hereinafter.

Additional objects, advantages and features of invention reside in the construction, arrangement and combination of parts involved in the embodiment of the invention, as will be understood from the following description and accompanying drawings, wherein Figure 1 is a view partly diagrammatic, showing a pair of glasses in elevation in which the lenses embody my invention, and indicating positions of the eyes in relation thereto in the use of such lenses.

Figure 2 is a similar view, illustrating the use of these glasses for distant and near vision, and showing the relation of the near vision elements of the lenses with respect to the normal line of sight of distant vision.

Figures 3 to 10 inclusive are plan views respectively, of possible forms of near vision elements, partially suggesting the range of variation possible in embodying my invention. In these views the circular outline indicates the form of the lens from which the near vision or reading lens element is formed, but which is cut away to the inner line, and replaced by glass of the refractive index of the major or distant vision element of the composite lens to be formed, or replacement by glass of a refractive index different from either of the other two elements.

Figure 7:
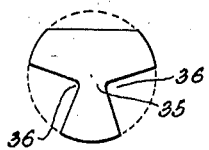

Referring more particularly to the drawings, there is shown in Figures 1 and 2 a pair of lenses in each, carried by a familiar nose-piece 21, each lens comprising a major element 22, which may be ground to usual prescription as heretofore familiar in the art, and which may be of any customary and preferred form as to contour, to suit the convenience of the user-wearer. In each lens there is set and fused in accordance with familiar practices in the art, near vision or reading lens elements 23, which may also be ground to proper prescription, in accordance with optical practice heretofore developed. The lenses may be optically de-centered in accordance with prior practice, and in addition, the elements 23 are spaced from each other a distance less than the normal pupilar distance of the wearer for distant vision. Each of the elements 23 comprises a triangular lens segment set in the major element 22, and in the present instance, are approximately of the form of one-quarter of a circular lens of the required optical power. The base of each of these triangular elements is defined by the curved lower edge 24 shown in Figure 1, which is preferably spaced from the extreme lower edge of the major element 22, while the sides 25 of the reading elements, disposed at an angle of approximately 90 degrees to each other, have apices located slightly below a line 26 which would represent the position of the horizon as viewed through the lenses by the wearer at a normal position of the head. Glass having a different refractive index from that of the major element may be used for the element 23, in accordance with usual practice in the production of such lenses. The element 23 has been found effective for use in reading and for viewing objects at close range with ample scope of field of view for average requirements.

In the use of this device as described, as shown in Figure 1, a near object may be viewed as indicated by lines 27 passing through the element 23, and representing approximately the line of vision when reading and viewing close objects. When, however, an object lying in approximately the same zone of view, but at a much greater distance is to be viewed, as for instance, a golf ball lying upon the ground while the wearer is standing, such object may be seen ordinarily by turning the head slightly to right or left, and directing the eyes thereto for binocular vision, when the line of sight will pass beside the element 23 through the major element 22, as indicated by the lines 28 or 29, according to the direction in which the head is turned in order to effect this result. By a slight downward tilt of the head at the same time, less lateral movement of the head will be required to enable such direct binocular vision of the object at a distance.

In Figure 2, the lines 30 indicate normal lines of sight for distant vision, or approximately the far point of pupilar distance, while the point 31 indicates the point on the lens at which such lines of vision would pass through the lenses when viewing an object approximately at the level of the horizon. The line 32 indicates the axis of focus of the eyes of the wearer when viewing reading matter, or objects of close range.

Figure 2 also indicates that the apices of the lens elements 23 may be rounded, as indicated at 33. This view also indicates that the junction of the base edges and sides of the lens elements 23 may be rounded also, as shown at 34.

In the production of a pair of glasses in accordance with my invention, the prescription is prepared in accordance with tests of the eyes of the patient, to determine the power of the respective lens elements. Considerable modification in the form of the reading elements 23 may be carried out, some of which are indicated in Figures 3 to 10. In Figure 3, it is shown how the elements may be diamond-shaped, and in Figure 4, they are shown in the form of matrix pieces which may be provided around the diamond elements to be fused into the major elements of the lens to be produced, these matrix elements being either of the same refractive index as the major element of the lens, where a bifocal lens is utilized, or being of a different refractive index from either of the two elements, in case an intermediate vision element is to be provided, so as to constitute a trifocal lens. Figure 5 illustrates the possibility of truncating the diamond shaped element so that it is flattened at the top, if desired, while Figures 6 and 7 indicate a practice of extending the upper part of the triangular element so as to broaden it, and leaving the reading element quite narrow at its middle portion, as indicated at 35, with projections 36 of the major lens elements into the reading elements, and enabling the observance of articles at a distance within a zone of view closely corresponding to that involved in ordinary reading, by a very slight movement of the head, as will be appreciated from the explanation of the use of the first described form of the invention.

Figure 8:
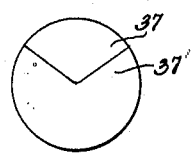

In Figure 8 there is illustrated a practice of inversion of the triangular near vision element, having some of the capabilities of use before described for the observance of nearby objects in the normal reading zone of vision, as indicated at 37, in which the reading element is in the form of a sector of a circular lens, which may be set in the major element with a matrix 37' of glass of the same index of refraction as the major element, or of a different refractive index lower than that of the sector 37, in which event it will function as an intermediate distance vision element. It is of course necessary that it be of higher refractive index than the material of the major element. It may be set with its apex (which is at the lower side of the piece) in the lower part of the major element of the lens, or otherwise arranged according to any special trade or occupation of the wearer in case such special adaptation is necessary.

Figure 9:
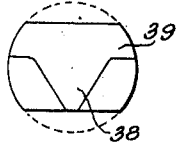
Figure 10:
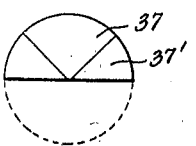

In Figure 9 the inverted triangular reading element 38 has its broader part extended, as at 39, affording a wide field for reading, which, however, is sufficiently below the level of the line of vision to the horizon to enable the ready observation of distant objects at higher levels, and enabling observation of distant objects at low levels in the zone of usual reading vision by slight lateral and upward movement of the head, and in fact, allowing observation of distant objects in a considerable zone vertically alined with the normal reading zone without any compensating movement of the head being required.

Figure 11:
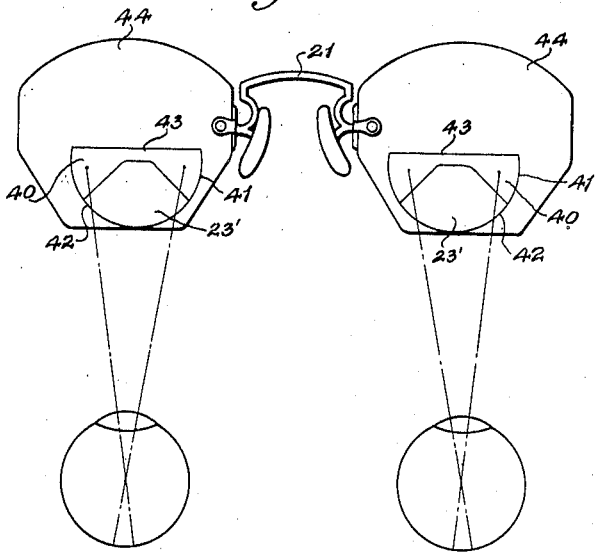
Figure 11 is an elevational view of a pair of lenses embodying my invention in a bi-focal lens.
Figure 12:
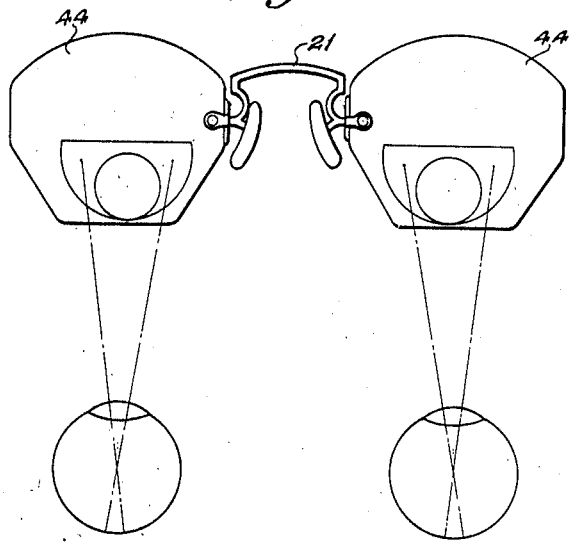
Figure 12 is a similar view showing a modification of the element applied to the major element of the lens.

In Figure 11 there is illustrated a practice in which my triangular near vision element 23', approximately corresponding to that shown in Figures 1 and 2, may be incorporated with an intermediate vision element 40, which is formed as a matrix unit over the apex and sides of the member 23', and having an outer edge portion 41 concentric with the lower edge portion 42 of the near vision element 23', and formed with a horizontal upper edge 43, so that the assembly of the near vision element 23' and the intermediate vision element 40 constitute a semicircular unit in the major element 44. In this case also, the near vision element 23' is shown as relatively somewhat larger than the corresponding element 23, first described, the fused-in parts extending to the bottom of the major lens, as shown.

In a case requiring correction by the tri-focal lens illustrated in Figure 11, an object such as a golf ball upon the ground a short distance from the person wearing the glasses cannot be readily viewed through the major element 44, and will be required to be viewed through the intermediate element 40, and in such case, the utilization of the glasses by the movement of the head as described in connection with the device of Figure 1, will enable the wearer to bring such object at intermediate distance into bi-focal vision through the intermediate lens 40 quite readily. In the tri-focal device, the element corresponding to the one 23' illustrated in Figure 11, may be variously formed, in accordance with the earlier description herein, and the form of the intermediate element 40 may also be varied, as discretion may dictate. In this device also, the element 40 will have an index of refraction between that of the element 23' and the major element 44, ordinarily in accordance with optical practice, and subject to variation in accordance with prescription practices relating to the visional correction.

While the triangular element of my near vision device has been shown as symmetrical, this is not an arbitrary requirement of form in the device, and triangles of various forms, in which the apex is not necessarily centered over the base, may be utilized, as well as other variations of forms practiced while retaining the advantages of the invention as above set forth.

In the devices of Figures 5 to 10, inclusive, the areas within the projected circles shown in these views may be comprised of intermediate vision elements obtained by using glass of special refractive value or other familiar means known in the optical trade and art, it being understood that the devices of such circular form are to be set in and fused upon a major element corresponding to the one 22 or the one 44, as found desirable.

While I have described specific forms of my invention and method of procedure in production of use of the same, it will be understood that these are purely exemplary, for the guidance of those having use of the invention, and that various changes in construction, form and arrangement of parts and substitution of equivalents may be made without departing from the spirit of the invention, as more particularly set forth in the appended claim, wherein:

I claim:

A trifocal lens for optical use comprising a major lens element, an approximately triangular truncated near vision element set therein of different power, the truncation being presented in the line of vision to the horizon as normally viewed and a matrix element for intermediate distance vision having portions of material area in and abutting the sides of the near vision element and a horizontal upper boundary spaced a distance above the truncated portion of the near vision element for the purposes described.

HARVEY C. RONES